United States Patent [19]

Masuda et al.

[11] Patent Number: 5,153,302

[45] Date of Patent: Oct. 6, 1992

[54] POLYESTER FILM FOR CAPACITOR

[75] Inventors: Narihiro Masuda, Yokohama; Syuji Anno, Nagahama, both of Japan

[73] Assignee: Diafoil Company, Limited, Tokyo, Japan

[21] Appl. No.: 782,138

[22] Filed: Oct. 25, 1991

[30] Foreign Application Priority Data

Oct. 29, 1990 [JP] Japan .................................. 2-291005

[51] Int. Cl.$^5$ .............................................. C08G 63/88
[52] U.S. Cl. .................................... 528/272; 528/298; 528/302; 528/307; 528/308; 528/308.6; 528/493; 428/364; 361/212
[58] Field of Search ............... 528/272, 298, 302, 308, 528/307, 308.6, 493; 428/364; 361/212; 264/210.1

[56] References Cited

U.S. PATENT DOCUMENTS

| | | | |
|---|---|---|---|
| 3,956,228 | 11/1976 | Nogami et al. | 524/604 |
| 4,059,715 | 11/1977 | Pletcher | 428/349 |
| 4,284,699 | 8/1981 | Berwick et al. | 430/96 |
| 4,568,616 | 2/1986 | Seifried et al. | 428/480 |
| 4,786,708 | 11/1988 | Serini et al. | 528/176 |
| 5,004,649 | 4/1991 | Yamasaki et al. | 428/461 |
| 5,069,962 | 12/1991 | Okazaki et al. | 428/323 |

Primary Examiner—Samuel A. Acquah
Attorney, Agent, or Firm—Kenyon & Kenyon

[57] ABSTRACT

A biaxially oriented polyester film for use in a capacitor having improved break down strength, which polyester having an acid component at least 90% by mole of which is terephthalic acid and a glycol component at least 97% by mole of which is 1,4-cyclohexanedimenthanol, in which film, an extracted amount with chloroform is not more than 1.3% by weight per 24 hours.

8 Claims, No Drawings

POLYESTER FILM FOR CAPACITOR

BACKGROUND OF THE INVENTION

1. Field of the Invention

The present invention relates to a polyester film for use in a capacitor. More particularly, the present invention relates to a biaxially oriented polyester film which has good breakdown strength and is suitable for use in a capacitor.

2. Description of the Related Art

Since poly-1,4-cyclohexanedimethylene terephthalate (hereinafter referred to as "PCT") has a higher melting point and a higher glass transition temperature than polyethylene terephthalate (hereinafter referred to as "PET"), a capacitor comprising a PCT film has stable electric characteristics in a wide temperature range, good dielectric strength at a high temperature and good resistance to hydrolysis, so that such capacitor has excellent durability even under high temperature and humidity conditions (see. Soc. Plastics Engrs. J., 17, 1083 (1961) and *Insulation*, April, 36 (1961)).

When break down strength of a PCT film having a small area of about 50 mm$^2$ according the method defined by JIS C 2319, it is better than that of a PET film. However, when a capacitor comprising a PCT film with a large effective area of 10,000 mm$^2$ according to the method defined by JIS C 2318 and its break down strength is measured, it is often lower than that of a PET film capacitor made by the same method. In general, as a capacitance of a capacitor increases, namely an effective area increases, the capacitor easily picks up insulation defects in the film so that a breakdown voltage of the capacitor decreases. The above fact that the break down strength of the PCT film and that of the PET film are reversed by the difference of the effective area may indicate that the PCT film possibly has more insulation defects than the PET film.

Though, as a film for a capacitor, some properties of the PCT film are much better than those of the PET film, the tendency of having more insulation defects is a large problem in using the PCT film in the capacitor.

SUMMARY OF THE PRESENT INVENTION

One object of the present invention is to provide a PCT film having less insulation defects.

Another object of the present invention is to provide a PCT film which is suitable for use in a capacitor.

According to the present invention, there is provided a biaxially oriented polyester film for use in a capacitor, said polyester comprising an acid component at least 90% by mole of which is terephthalic acid and a glycol component at least 97% by mole of which is 1,4-cyclohexanedimethanol, in which film, an extracted amount with chloroform is not more than 1.3% by weight per 24 hours.

DETAILED DESCRIPTION OF THE INVENTION

In the polyester to be used in the present invention, at least 90% by mole, preferably at least 95% by mole of the acid component is terephthalic acid. When the content of terephthalic acid in the acid component is less than 90% by mole, the resulting PCT film loses heat resistance. The acid component may comprise other acid in an amount of less than 10% by mole. As the other acid, a dicarboxylic acid consisting of carbon, hydrogen and oxygen atoms can be used. Examples of such dicarboxylic acid are aromatic dicarboxylic acids (e.g. isophthalic acid, 2,6- or 2,7-naphthalenedicarboxylic acid, 4,4'-diphenylcarboxylic acid, etc.) and aromatic hydroxy acids (e.g. p-hydroxybenzoic acid, etc.).

The glycol component comprises at least 97% by mole, preferably at least 99% by mole of 1,4-cyclohexanedimethanol. When the content of 1,4-cyclohexanedimethanol is less than 97% by mole, the resulting PCT film loses heat resistance. The glycol component may comprise other diol component which consists of carbon, hydrogen and oxygen atoms in an amount of less than 3% by mole. Examples of such diol are ethylene glycol, propylene glycol, 1,4-butanediol and the like. A ratio of a cis-isomer to a transisomer in 1,4-cyclohexanedimethanol is not critical. Preferably, this ratio is from 4:6 to 0:10.

PCT to be used in the present invention may be prepared by a conventional melt polymerization method. In order to reduce amounts of low molecular weight materials and pyrolyzed materials contained in the produced polymer, the melt polymerization is stopped when the polymerization proceeds to a suitable extent, and then the melt polymerized product is subjected to solid phase polymerization to obtain the polymer having a desired polymerization degree. When the polymer prepared by such polymerization method is extracted with chloroform for 24 hours, an amount of extracted materials is 0.6% by weight or less, preferably 0.3% by weight or less.

The polymerization degree of the polymer is adjusted so that an intrinsic viscosity of the polymer, which is measured by the below described method, is at least 0.75, preferably at least 0.85 in view of the decrease of the polymerization degree during film formation by melting and film continuity during stretching.

The polyester film of the present invention may contain fine particles inactive to the polyester, if necessary. For example, to improve slipperiness of the film, the film can contain inorganic or organic fine particles such as kaolin, talc, silicon dioxide, calcium carbonate, lithium fluoride, titanium dioxide, zeolite, calcium terephthalate, crosslinked polymers and the like. The fine particles preferably have an average particle size of 0.01 to 5 μm, and an addition amount is from 0.05 to 1.0% by weight based on the weight of PCT.

In addition, the polyester film of the present invention may contain a conventional additive such as a stabilizer, an atioxidant and the like. An amount of the additive is usually 1.3% by weight or less, preferably 0.5% by weight or less, more preferably 0.2% by weight or less based on the weight of PCT. When the amount of the additive exceeds the above upper limit, the amount of the extracted materials with chloroform cannot be decreased to 1.3% by weight or less.

The inactive fine particles and/or the additive may be compounded in PCT by a conventional method for compounding them in PET. In particular, when the additive is compounded, preferably a master batch containing the additive in a high concentration is prepared and then diluted with a virgin polymer when forming a film, since an amount of the polymer which is subjected to thermal history by melt kneading can be reduced.

When the polyester film of the present invention is extracted with chloroform for 24 hours, the amount of the extracted materials is 1.3% by weight or less, preferably 1.1% by weight or less, more preferably 0.8% by weight or less. Such small amount of the extracted materials can be achieved by minimizing the amount of the pyrolyzed or oxidatively destructed materials. In comparison with PET, PCT is easily oxidatively deteriorated during melt extrusion and pyrolyzed since a melt extrusion temperature of PCT should be set higher than PET. Accordingly, the PCT film contains a larger amount of the destructed materials and the low molecular weight materials generated by thermal destruction and pyrolysis than the PET film. To prevent this, it is effective to remove oxygen from a hopper of an extruder by evacuating the hopper or filling the hopper with nitrogen gas so as to suppress the oxidative destruction. However, it is difficult to completely remove oxygen from the hopper, and a small amount of oxygen contained in the polymer cannot be neglected. Then, in order to minimize the influence of oxygen and suppress the pyrolysis, it is preferable to keep the extrusion temperature as low as possible. In particular, since PCT which has been subjected to the solid phase polymerization has a high melt viscosity, a resin temperature at an exit of the extruder tends to become very high due to shear when an extrusion screw which is usually used for extruding PET is used. To suppress the heat generation due to shear, it is preferred to use a full-flighted screw or a double flighted screw having a compression ratio of 1.5 to 2.3 and an L/D ratio of 20 to 28. A difference between the resin temperature at the extruder exit and a crystalline melting point of the formed film is usually 30° C. or less, preferably 20° C. or less. To increase an discharged amount while keeping this temperature difference as small as possible, the double flighted screw is more advantageous than the full-flighted screw.

To decrease the insulation defects in a polymer film for a capacitor, it is contemplated to remove foreign particles or agglomerates of particles present in the polymer. For example, the polymer melt can be filtered. In this case, preferably a filter to be used can filter off particles corresponding to at least 1000 mesh.

Now, a film forming condition of the polyester film of the present invention will be explained.

Polymer chips are usually dried at a temperature of 120° to 150° C. for 3 to 4 hours, and melt extruded as described above with minimizing the oxidative and thermal deterioration. To make a film thickness uniform, it is preferred to use a metering pump. For sheeting, it is preferred to cool and solidify the polymer with contacting the sheet onto a casting drum by an electrostatic contacting method. In particular, when the polyester has a composition such that contents of 1,4-cyclohexanedimethanol in the acid component and of terephthalic acid in the glycol component are both almost 100%, the electrostatic contacting method is often employed since a crystallization rate of such polyester is high.

An obtained unstretched film is then stretched. For stretching, the film is generally stretched by sequential stretching, namely the film is stretched in a lengthwise direction by rolling, and then in a width direction by tentering. A suitable stretching temperature is from 85° to 130° C. When the stretching temperature is lower than 85° C., the stretched film tends to be whitened or suffer from irregular stretching. At a stretching temperature higher than 130° C., the polymer is not oriented by stretching and the film tends to have uneven thickness. A preferred stretching temperature range is from 95° to 120° C. By stretching, the film having a thickness of 0.5 to 15 μm which is suitable for the capacitor is stably produced.

A stretch ratio is from 3.0 to 5.0 times, preferably from 3.3 to 4.3 times in the lengthwise direction and from 3.0 to 5.0 times, preferably from 3.3 to 4.5 times in the width direction. Such stretch ratio may be achieved by stretching the film in a single step, though it may be achieved by stretching the film in a two or more steps.

A rate of strain in the lengthwise stretching is from 5000 to 100,000%/min., preferably from 10,000 to 60,000%/min. At this rate of strain, the fluctuation of the film thickness is decreased.

The biaxially oriented film is supplied in a heat setting zone and heat set. Usually, the heat setting is carried out by the tentering method, and a hot air heated at a temperature of 150° to 260° C., preferably 180° to 240° C. is blown on the film for one second to three minutes. During heat setting, the film can be relaxed or tentered in the width direction.

When a surface of a roll for stretching or winding the film has flaws or foreign particles, the film to be contacted to the surface periodically has insulation defects. Preferably, the roll surface has the flaws or the foreign particles as few as possible.

PREFERRED EMBODIMENTS OF THE INVENTION

The present invention will be illustrated by the following Examples.

In the Examples, properties are measured by the following methods:

1. Extracted amount with chloroform

About 100 g of a film or polymer chips is comminuted and vacuum dried at 100° C. for 24 hours. Then, the polymer powder is precisely weighed (A g), extracted with chloroform under reflux for 24 hours, dried and again weighed (B g). The extracted amount is calculated according to the following equation:

$$\text{Extracted amount (wt. \%)} = \frac{A - B}{A} \times 100$$

2. B.D.V of a small area film

According to the method defined by JIS C 2319, Section 7.8, a breakdown voltage (B.D.V.) for a film having an effective area of about 50 mm² is measured.

3. B.D.V. of a large area film

According to the method defined by JIS C 2318, Section 6.3.8, B.D.V. for a film having an effective area of about 10,000 mm² is measured.

4. Intrinsic viscosity [η]

One gram of the polymer or film is dissolved in a mixed solvent of phenol and tetrachloroethane in a weight ratio of 50:50 and a viscosity is measured at 30° C. In this case, the intrinsic viscosity is calculated using the Hüggins constant of 0.33 irrespective of the polymer compositions.

5. Resin temperature at extruder exit

A highly sensitive thermometer is set at a center of an exit conduit of the extruder and a temperature of the flowing resin is measured.

6. Crystalline melting point of a film

Using a DSC-1 type differential scanning calorimeter (manufactured by Perkin-Elmer), a DSC chart is recorded at a heating rate of 16° C./min, and an endothermic peak temperature due to crystalline melting is regarded as a crystalline melting point.

EXAMPLE 1

A dicarboxylic acid component consisting of 95% by mole of terephthalic acid and 5% by mole of isophthalic acid and a glycol component consisting of 100% of 1,4-cyclohexanedimethanol having a cis/trans ratio of 7:3 were heated while stirring in a polymerization reactor in the presence of titanium oxide as a catalyst in an amount of 0.06% by mole based on the weight of the acid component to effect esterification.

After adding amorphous silica having an average particle size of 1.3 $\mu$m in an amount of 0.15% by weight based on the weight of the polymer, the ester was polycondensated to obtain poly-1,4-cyclohexanedimethylene terephthalate copolymer having an intrinsic viscosity $[\eta]$ of 0.65. The polymer was chipped and solid phase polymerized in a nitrogen gas stream to obtain a polyester having an intrinsic viscosity $[\eta]$ of 1.05. The extracted amount with chloroform was 0.18% by weight.

After drying the polyester at 120° C. for 4 hours, the polyester was supplied in an extruder having a double flighted screw with a compression ratio of 2.0 and an L/D ratio of 25 and equipped with a vacuum hopper, and melt extruded with applying a reduced pressure of about 1 Torr. During the melt extrusion, a barrel temperature was kept at 300° C., and the resin temperature at the extruder exit was 306° C.

The extruded polymer melt was cooled on a casting drum kept at 40° C. by the electrostatic contacting method to form an unstretched film having a thickness of about 55 $\mu$m.

Then, the unstretched film was preheated by contacting it to a metal roll kept at 100° C. and 3.1 times stretched in the lengthwise direction between a pair of rolls which were rotated at different circumferential speeds while irradiating the film with an IR heater. A rate of strain was 50,000%/min.

The film was forwarded to a tenter and 3.6 times stretched in the width direction at 115° C. and heat set at 220° C. in the same tenter to obtain a biaxially oriented film having a thickness of 5 $\mu$m.

Properties of the obtained film are shown in the Table.

The extracted amount from the film with chloroform was small, and therefore, decrease of B.D.V. of the large area film was small.

COMPARATIVE EXAMPLE 1

The solid phase polymerized polyester as used in Example 1 as such was used. After drying, the polyester was supplied in an extruder having a conventional type screw with a compression ratio of 3.4 and an L/D ratio of 25 and equipped with a vacuum hopper and melt extruded under a reduced pressure of about 1 Torr. in the same manner as in Example 1. Though the barrel temperature was kept at 300° C., the resin temperature at the extruder exit was raised to 335° C.

Thereafter, the polymer was casted, stretched in the lengthwise direction and the width direction and heat set in the same manner as in Example 1 to obtain a biaxially oriented film having a thickness of 5 $\mu$m.

The properties of the obtained film are shown in the Table.

Since the resin temperature was higher than that in Example 1, the intrinsic viscosity $[\eta]$ decreased and the extracted amount from the film with chloroform increased. As the result, B.D.V. of the large area film greatly decreased.

EXAMPLE 2

A dicarboxylic acid component consisting of 100% of terephthalic acid and a glycol component consisting of 100% of 1,4-cyclohexanedimethanol having a cis/trans ratio of 7:3 were heated while stirring in a polymerization reactor in the presence of titanium oxide as a catalyst in an amount of 0.06% by mole based on the weight of the acid component to effect esterification.

After adding amorphous silica having an average particle size of 1.3 $\mu$m in an amount of 0.15% by weight based on the weight of the polymer, the ester was polycondensated to obtain poly-1,4-cyclohexanedimethylene terephthalate copolymer having an intrinsic viscosity $[\eta]$ of 0.60. The polymer was chipped and solid phase polymerized in a nitrogen gas stream to obtain a polyester having an intrinsic viscosity $[\eta]$ of 0.96. The extracted amount with chloroform was 0.20% by weight.

After drying the polyester under the same condition as in Example 1, the polyester was supplied in the same extruder as used in Example 1 and melt extruded with applying a reduced pressure of about 1 Torr. During the melt extrusion, a barrel temperature was kept at 305° C., and the resin temperature at the extruder exit was 310° C.

Thereafter, the polymer was casted, stretched in the lengthwise direction and the width direction and heat set in the same manner as in Example 1 to obtain a biaxially oriented film having a thickness of about 5 $\mu$m.

Properties of the obtained film are shown in the Table.

Similar to the film of Example 1, the extracted amount from the film with chloroform was small, and therefore, decrease of B.D.V. of the large area film was small.

COMPARATIVE EXAMPLE 2

A polymer having an intrinsic viscosity $[\eta]$ of 0.65 which was prepared in the same manner as in Example 1 except that the polymer was not solid phase polymerized was used as a raw material. The extracted amount from this polymer with chloroform was 1.05% by weight.

After drying at 135° C. for 4 hours, this polyester was supplied in the same extruder as used in Example 1 and melt extruded with applying a reduced pressure of about 1 Torr. During the melt extrusion, a barrel temperature was kept at 300° C., and the resin temperature at the extruder exit was 302° C.

Thereafter, the polymer was casted, stretched in the lengthwise direction and the width direction and heat set in the same manner as in Example 1 to obtain a biaxially oriented film having a thickness of 5 $\mu$m.

Properties of the obtained film are shown in the Table.

Though the thermal deterioration of the film caused by extrusion was at the same level as in Example 1, the extracted amount from the film with chloroform was large and therefore, B.D.V. of the large area film was greatly decreased.

COMPARATIVE EXAMPLE 3

Polyethylene terephthalate containing amorphous silica having an average particle size of 1.3 $\mu$m was melt polymerized by a conventional method only. The polyester had an intrinsic viscosity [η]of 0.66, and an extracted amount with chloroform was 1.45% by weight.

After drying at 180° C. for 4 hours, this polyester was supplied in the same extruder as used in Example 1 and melt extruded with applying a reduced pressure of about 1 Torr. During the melt extrusion, a barrel temperature was kept at 285° C., and the resin temperature at the extruder exit was 287° C.

Thereafter, the polymer was casted in the same manner as in Example 1, stretched in the lengthwise direction and the width direction and heat set in the same manner as in Example 1 except that the preheating roll was kept at 80° C. and the stretching in the width direction was carried out at 105° C. to obtain a biaxially oriented film having a thickness of 5 μm.

Properties of the obtained film are shown in the Table.

Since the film was a PET film, the extracted amount from the film with chloroform was larger than that of Example 1. Though the decrease of B.D.V. of large area film was not large, the absolute value of B.D.V. was smaller than that of PCT.

TABLE

|  | Example No. | | | | |
| --- | --- | --- | --- | --- | --- |
|  | 1 | 2 | C.1 | C.2 | C.3 |
| Polymer composition (% by mole) | | | | | |
| TPA*[1] | 95 | 100 | 95 | 95 | 100 |
| 1,4-CHDM*[2] | 100 | 100 | 100 | 100 | No |
| Other*[3] | IPA 5 | No | IPA 5 | IPA 5 | EG 100 |
| Raw polymer [η] | 1.05 | 0.96 | 1.05 | 0.65 | 0.66 |
| Extruder screw | | | | | |
| Compression ratio | 2.0 | 2.0 | 3.4 | 2.0 | 3.4 |
| L/D | 25 | 25 | 25 | 25 | 25 |
| Resin temperature at extruder exit (°C.) | 306 | 310 | 335 | 302 | 287 |
| Film [η] | 0.86 | 0.75 | 0.65 | 0.55 | 0.61 |
| Extracted amount with chloroform (% by weight) | 0.70 | 1.10 | 1.95 | 1.65 | 1.55 |
| Melting point of film (°C.) | 285 | 291 | 285 | 285 | 285 |
| B.D.V. (KV) Small area: | | | | | |
| Average | 3.05 | 3.05 | 3.00 | 3.00 | 2.80 |
| Maximum | 3.46 | 3.44 | 3.44 | 3.40 | 3.20 |
| Minimum | 2.74 | 2.66 | 2.54 | 2.57 | 2.43 |
| B.D.V. (KV) Large area: | | | | | |
| Average | 2.15 | 2.05 | 1.76 | 1.83 | 1.95 |
| Maximum | 2.41 | 2.43 | 2.01 | 2.16 | 2.32 |
| Minimum | 1.74 | 1.62 | 1.22 | 1.21 | 1.50 |

Note:
*[1] Terephthalic acid.
*[2] 1,4-Cyclohexanedimethanol.
*[3] IPA: Isophthalic acid. EG: Ethylene glycol.

What is claimed is:

1. A biaxially oriented polyester film for use in a capacitor, said polyester comprising an acid component at least 90% by mole of which is terephthalic acid and a glycol component at least 97% by mole of which is 1,4-cyclohexanedimethanol, in which film, an extracted amount with chloroform is not more than 1.3% by weight per 24 hours.

2. The biaxially oriented polyester film according to claim 1, wherein a content of terephthalic acid in said acid component is at least 95% by mole.

3. The biaxially oriented polyester film according to claim 1, wherein a content of 1,4-cyclohexanedimethanol in said glycol component is at least 99% by mole.

4. The biaxially oriented polyester film according to claim 1, wherein said acid component contains at least one other dicarboxylic acid selected from the group consisting of isophthalic acid, 2,6- and 2,7-naphthalenedicarboxylic acid, 4,4'-diphenylcarboxylic acid and p-hydroxybenzoic acid.

5. The biaxially oriented polyester film according to claim 1, wherein said glycol component contains at least one other diol selected from the group consisting of ethylene glycol, propylene glycol and 1,4-butanediol.

6. The biaxially oriented polyester film according to claim 1, wherein 1,4-cyclohexanedimethanol has a cis/trans ratio of from 4:6 to 0:10.

7. The biaxially oriented polyester film according to claim 1, wherein said extracted amount with chloroform is not more than 1.1% by weight per 24 hours.

8. The biaxially oriented polyester film according to claim 1, wherein said extracted amount with chloroform is not more than 0.8% by mole per 24 hours.

* * * * *